Patented May 29, 1923.

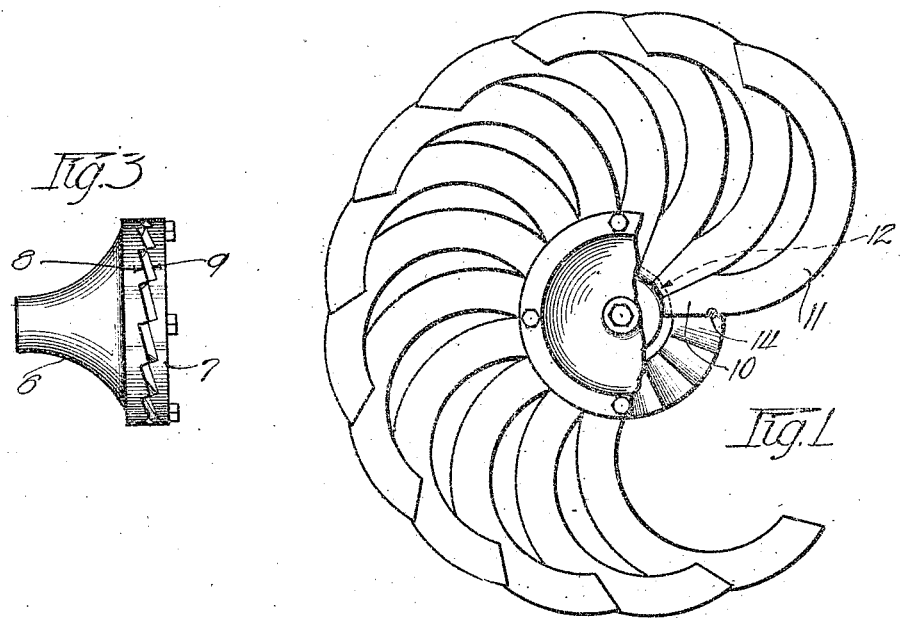
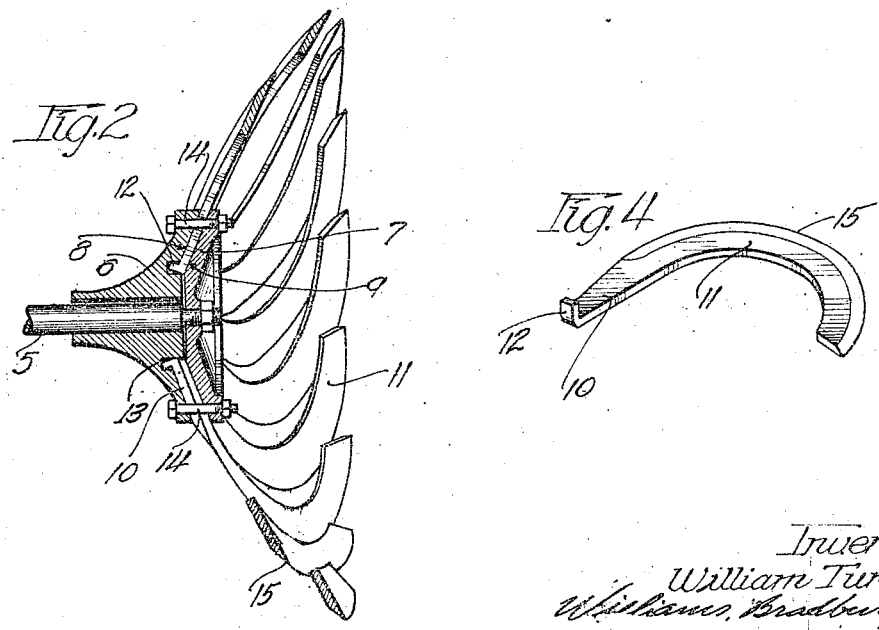
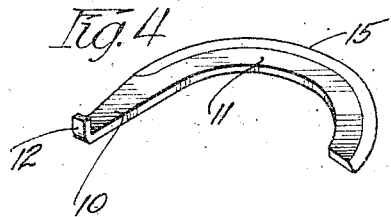

1,456,860

UNITED STATES PATENT OFFICE.

WILLIAM TURNER, OF EAST CHICAGO, INDIANA.

EARTHWORKING DEVICE.

Application filed April 27, 1921. Serial No. 464,885.

*To all whom it may concern:*

Be it known that I, WILLIAM TURNER, a citizen of the United States, and resident of East Chicago, in the county of Lake and State of Indiana, have invented a certain new and useful Improvement in Earthworking Devices, of which the following is a full, clear, concise, and exact description, reference being had to the accompanying drawings, forming a part of this specification.

My invention relates to improvements in earth working devices for rotary plows, and is particularly concerned with the provision of an earth working device adapted to be secured to a driven shaft carried by a suitable vehicle, and driven by suitable means in which the axis of the driven shaft extends substantially parallel with the line of travel of the vehicle.

The objects of my invention are:

First; to provide an earth working device comprising a plurality of cutting elements, the inner ends of which are secured to a suitably formed hub, and the cutting edges of which are so curved as to cause the earth working device to automatically clear itself.

Second; to provide an earth working device of the character described in which the cutting elements are so conformed as to cause the earth working device to ride upwardly over stones or other obstructions encountered by the earth working device without injury thereto.

Third; to provide an earth working device such as described, comprising a comparatively large number of cutting elements, each having a comparatively low pitch, whereby an earth working device having a comparatively large lead and low speed is produced, and Fourth: to provide an earth working device of the character described, the cutting elements of which are formed from flat pieces of spring steel, and secured to a hub member in such manner as to cause the cutting edges of the cutting elements to lie in a common more or less convex surface.

Other objects will appear as this description progresses, reference being had to the accompanying drawings in which Figure 1 is an end elevation of my improved earth working device, portions thereof being broken away for the purpose of better illustration;

Figure 2 is a central longitudinal section;

Figure 3 is a side elevation of the hub member, and

Figure 4 is a perspective view of one of the cutting elements.

In my co-pending applications, Serial Nos. 412,713 and 460,235, filed September 25, 1920, and April 11, 1921, respectively, I have illustrated and claimed a rotary plow construction comprising a shaft which is supported and carried by suitable vehicle mechanism, and to which is secured an earth working device comprising a plurality of cutting elements which are secured to the shaft in such manner that each of the cutting elements will have a certain pitch. The axis of the shaft extends substantially parallel with the line of travel of the vehicle, and suitable means are provided to permit the shaft to move in a vertical plane against the tension of the spring, so as to permit the earth working device to ride over stones and other obstacles. Means are also provided for adjusting the depth to which the earth working device will enter the earth. The earth working device forming the subject matter of my present application constitutes an improvement over the earth working device disclosed in my earlier patent application above referred to, but is similar to that shown in my second patent application, this application being a division of the last-mentioned application.

Referring to the drawings, I have shown a driven shaft 5, to the free end of which is secured a hub which is transversely divided into the two members 6 and 7. The opposing faces of the hub members 6 and 7 are provided with radially extending seats 8 and 9 for receiving the inner ends 10 of the curved cutting elements 11. The inner ends 10 of these cutting elements are provided with tangs 12, which are adapted to be received in an annular groove 13 formed in the outer end of the hub member 6, as shown in Figure 2. The inner ends of the cutting elements are secured in their seats by means of bolts 14 which extend through the edges of the hub members 6 and 7, and serve to clamp these members against the opposite faces of the inner ends of the cutting elements. It will be noted from an inspection of Figures 2 and 4 that all portions of the cutting elements 11, with the exception of the tang portion, lie in the same plane, that is, the cutting element is made from a flat bar which is transversely curved, and the convex edge of which is sharpened as shown at 15 to provide a cutting edge.

The radially extending seats 8 and 9 of the hub members are inclined both longitudinally and transversely so that when the inner ends of the cutting elements are clamped between the two hub members, as shown in Figures 1 and 2, the cutting edges 15 of the cutting elements will lie in a common convex surface. By making the convex edges of the cutting elements 11 the cutting edges, I provide an earth working device which readily clears itself of weeds, straw, corn stubble and the like, and by causing the cutting edges to form a convex surface, I have provided an earth working device which easily and readily rides up over obstructions such as stones, and the like, without injury to the cutting elements. It will be noted that I employ a comparatively large number of cutting elements, the pitch of which is also comparatively small. This produces an earth working device to which a minimum amount of resistance to its rotation will be offered, but which, at the same time, has a comparatively large total lead so that the shaft 5 can rotate at a comparatively low speed, even though the forward movement of the cutting device is comparatively rapid.

While the cutting elements 11 may be made of any suitable material, I prefer to make them of spring steel. By inclining the radially extending seats 8 and 9, both longitudinally and transversely, I can form the cutting elements 11 from flat stock, thereby very materially lessening the cost of manufacture of the earth working device.

While I have described the details of construction of the preferred embodiment of my invention, it is to be understood that my invention is not limited to these details of construction, but is capable of other adaptation and modifications coming within the scope of the appended claims.

Having thus described my invention, what I claim is:

1. An earth working device for rotary plows comprising a hub member transversely divided into two parts having opposing clamping faces, one of said faces having a plurality of radially extending seats therein, and a plurality of flat, curved cutting elements having their inner ends clamped between said seats and the other of said faces, the convex edges of said cutting elements being sharpened, said seats being inclined longitudinally and transversely to hold the sharpened edges of said cutting elements in a common convex surface.

2. An earth working device for rotary plows comprising a hub member having a plurality of radially extending seats formed therein, and a plurality of flat, curved cutting elements having their inner ends secured in said seats, the convex edges of said cutting elements being sharpened and the said seats being inclined longitudinally and transversely to hold the sharpened edges of said cutting elements in a common convex surface.

3. An earth working device for rotary plows comprising a hub member having a plurality of radially extending seats formed therein, and a plurality of flat, curved cutting elements having their inner ends secured in said seats, the said seats being inclined longitudinally and transversely.

In witness whereof, I hereunto subscribe my name this 23rd day of April, 1921.

WILLIAM TURNER.

Witnesses:
EDNA V. GUSTAFSON,
EMILE J. BOURGEOIS.